United States Patent [19]

Steele

[11] 4,299,875

[45] Nov. 10, 1981

[54] FIRE RETARDANT PRINTED WOOD PANELING

[75] Inventor: Wallace A. Steele, High Point, N.C.

[73] Assignee: The Lilly Company, High Point, N.C.

[21] Appl. No.: 68,092

[22] Filed: Aug. 20, 1979

Related U.S. Application Data

[62] Division of Ser. No. 851,730, Nov. 15, 1977, Pat. No. 4,200,673.

[51] Int. Cl.³ .................................................. B32B 3/30

[52] U.S. Cl. .................................... 428/172; 428/921

[58] Field of Search ............... 144/309 F, 321, 309 A, 144/328; 428/173, 920, 151, 314, 921, 557, 172, 165, 163, 167, 168, 171; 52/232; 427/264, 271, 275, 408, 291; 106/18.11

[56] References Cited

U.S. PATENT DOCUMENTS

| | | | |
|---|---|---|---|
| 3,454,413 | 7/1969 | Miller | 427/288 |
| 3,536,574 | 10/1970 | Buckley | 428/151 |
| 3,654,044 | 4/1972 | Hirota | 428/151 |
| 3,811,992 | 5/1974 | Hanada et al. | 427/291 |
| 3,936,541 | 2/1976 | Plowmun et al. | 427/264 |
| 3,969,291 | 7/1976 | Fukula et al. | 428/921 |
| 4,024,310 | 5/1977 | Wooler et al. | 428/921 |
| 4,068,031 | 1/1978 | Cooley et al. | 428/921 |
| 4,086,382 | 4/1978 | Hites | 428/921 |

*Primary Examiner*—Stanley S. Silverman
*Attorney, Agent, or Firm*—Dressler, Goldsmith, Shore, Sutker & Milnamow, Ltd.

[57] ABSTRACT

Printed wood paneling having a reduced flame spread rating is provided by embossing the wood surface to be finished to depress in a relatively uniform pattern of depressed portions at least about 20% up to about 70% of the surface area of the wood to a depth of at least about 0.01 inch, and these depressed portions are then filled with an intumescent fire retardant filler and the excess filler is substantially removed from the undepressed portions of the wood surface. The embossed panel with the depressed portions thereof filled with intumescent fire retardant filler is then finished in conventional fashion by applying a filler, sanding, base coating, printing, and usually embossing. A clear topcoat is then applied to protect the finish. When a flame impinges upon the finished surface, the heat is transmitted to the buried intumescent material causing expansion of this material and the production of a uniform pattern of raised portions of difficulty burnable foam insulating material which retards the flame spread rate.

5 Claims, No Drawings

FIRE RETARDANT PRINTED WOOD PANELING

This is a division of application Ser. No. 851,730, filed Nov. 15, 1977, now U.S. Pat. No. 4,200,673.

The present invention relates to wood paneling which is coated, printed and optionally embossed in order to provide an attractive grained appearance. Such paneling is unduly combustible, and this invention relates to the modification of the paneling in order to significantly upgrade its fire resistance with only minimal detriment to the appearance of the product.

It is well known to take panels which are surfaced with veneers of inexpensive woods, and especially hardwoods, and coat, print and optionally emboss a surface thereof so as to provide an attractive texture and pattern which is luxurious in appearance, but which is inexpensive so as to provide a very practical interior finishing material which is particularly appropriate for the construction of mobile homes where minimal cost is essential. Unfortunately, these panels are combustible, and the flame spreading characteristic is normally measured by the ASTM E-84 flame spread tunnel method. Three main classes of performance have been assigned, these classes being identified by classes A, B, and C. Class A performance is identified by a flame spread rating of 25 or less, class B performance is indicated by a flame spread rating of 25–75, and class C performance is indicated by a flame spread rating of 75–200. On this performance scale, most of the printed and embossed wood paneling in commerce today has a rating of about 150–200 which places it at the least satisfactory portion of the range of class C performance. With heavier plywoods, typical flame spread ratings are 140–160, while with the thinnest and least expensive paneling, flame spread ratings are in the range of 190–200, and sometimes the ratings are even higher. For behind the stove use, the Department of Housing and Urban Development has set forth a requirement for a flame spread rating not in excess of 50.

Gypsum board is inherently more fire resistant than wood, though it does not have the same attractive appearance when prefinished in the same manner as plywood, that is with liquid coatings to comprise a printed design. This is because of the greater absorbancy and reduced sandability of gypsum. Such board normally has a flame spread rating below 25, but the ultimate fire resistance is a function of the decorative material used to surface the board. Thus, vinyl-surfaced gypsum has a flame spread rating of 40–50, depending on the guage and type of film used.

As will be evident, if the flame spreading can be reduced, the opportunity to safely leave a building which is on fire is increased, and this is the goal of this invention. At the same time, the value of a home is partially dependent on its appearance, and the objective is to provide maximum beauty combined with increased safety.

In this invention, and using the thinnest and least costly wood veneer currently available, the flame spread rating can be lowered to 50 or less, and still lower ratings can be reached using heavier paneling or superior grades of wood. Class A or class B flame spread ratings are particularly contemplated.

In accordance with the present invention, the wood surface to be finished, such as a Phillipine Mahogany or similar species, is embossed to depress in a relatively uniform pattern of depressed portions at least about 20% up to about 70%, preferably from 25% to 50%, of the surface area of the wood to a depth of at least about 0.01 inch, preferably about 0.03 inch, and these depressed portions are then filled with an intumescent fire retardant filler and the excess filler is substantially removed from the undepressed portions of the wood surface. These depressed portions are usually lines, the term "lines" being intended to embrace lines which are either continuous or broken. A pattern of dots of any desired shape can also be used. The pattern may be of any character so long as the buried intumescent material is supplied in a plurality of spaced apart discrete portions. Using lines as illustrative, these will typically have a width of about 1/32 inch to ⅛ inch in width and will be spaced about ¼ inch to ½ inch apart. Narrower lines will be more closely spaced.

The filling of the depressed lines and the removal of excess filler is conveniently accomplished by reverse roll coating adjusted to wipe the excess applied material from the undepressed portions of the wood surface. The purpose is to provide a substantial volume of intumescent fire retardant in a series of spaced apart discrete portions buried beneath the surface of the wood so that the normal characteristics of the wood surface is retained to permit overcoatings to adhere and to provide a sandable surface which may be embossed subsequently, if desired. The intumescent filler is now dried and the remaining treatment of the wood panel is conventional, as will now be described.

Prefinished plywood wall paneling with simulated wood grain or other decorative designs is presently produced by the print method. This is done by filling the pores of relatively open grain wood, such as Phillipine Mahogany, with a filler which is sanded to provide a smooth substrate. A basecoat is then applied to provide a background coloration, and then the design is applied in one or more printings. The surface of the finished wood may also be embossed to provide texture or pattern to enhance the design either before or after the printing operation. The finished panel is then protected by applying a protective topcoat which is usually a clear organic polymer coating which may be stained if desired. These conventional panels when made from a lauan plywood panel of 3.6 millimeter thickness and flame spread tested as described in ASTM E-84, typically provide a flame spread rating in the range of 190 to 200. The primary variation from this rating can be obtained by varying the thickness, but changes in the coating system will also provide a minor variation.

When the raw wood surface is embossed to form depressed portions therein which are filled with an intumescent binder and dried in accordance with this invention, then the conventional finishing operations produce a product having the same appearance and characteristics as is normally obtained, except the flame spread characteristic is greatly reduced.

When a flame impinges upon the finished surface in this invention, the heat is transmitted to the intumescent material which is confined or buried in the depressed portions beneath the surface of the wood causing expansion of this material and the production of a relatively uniform pattern of raised portions of difficultly burnable foam insulating material which keeps the flames away from the wood surface and greatly retards the rate at which the flames spread. If the intumescent material is not confined or burned as in this invention, then various difficulties are encountered, as will now be discussed.

First, there must be a sufficient quantity of intumescent material, for if there is not, then the lines of expanded difficultly burnable material will not rise high enough when heated to protect the wood surface and only a modest improvement will be obtained instead of the marked improvement obtained herein. Thus, if the natural porosity of the wood surface is relied upon instead of sufficiently depressed portions, then the quantity of material deposited within the natural porosity of the wood is inadequate and the difficultly burnable material does not rise far enough to adequately protect the wood. More particularly, class A performance is virtually impossible to obtain using high speed production applications, and class B performance is difficult to achieve.

It is also possible to try to apply a coating of intumescent material over the entire surface of the wood, but this is not feasible. It is hard to apply a uniform layer, so if the layer is thin, portions of the layer will not provide sufficient protection. If the layer is thick enough, the cost of materials increases, it is still difficult to control the thickness which is applied, and a smooth and attractive surface is hard to obtain, just as it is hard to obtain on the surface of gypsum board. Moreover, particularly the intumescent compositions do not normally sand well and thus tend to be rough, and they also tend to absorb subsequent coatings which makes it difficult to obtain the smooth and uniformly printed surface which is normally associated with the finished panels under consideration. Also, moisture and temperature conditions vary on the surface of hardwoods, such as lauan, kapur and similar species, as the result of weather conditions, plant location, etc., thus making it difficult to apply coatings of adequate thickness and still obtain uniform adhesion of the required overcoatings.

When the intumescent coating material is buried beneath the surface of the wood, then it dries more quickly and easily (some of the moisture in the coating is absorbed into the wood) and the intumescent material is consistently present in exactly the right thickness and with the desired uniform distribution over the surface of the wood. This distribution and the depth of the depressed portions is easily controlled by embossing the desired pattern into the new wood surface prior to the conventional finishing of the wood. The depressed portions preferably have a depth of from 0.025 to 0.035, but deeper depressions may be used. It will be recognized that the wood which is embossed is resilient, and the deeper embossments tend to recover somewhat, especially when the embossment is narrow, so some resilient recovery takes place and this must be kept in mind in making measurements.

When the intumescent coating is removed from the portions of the wood surface which have not been depressed by the preembossing, then a significant portion of the wood surface remains after the intumescent material has been applied, so sandable fillers will adhere and allow the smooth printable surface to be provided in normal fashion. Of course, some intumescent coating is absorbed into the wood surface, so wiping cannot be 100% effective.

When the intumescent material is heated to a temperature well above room temperature, but below the temperature at which burning occurs (about 400° F.–600° F.), a gas is generated which produces a foam structure. The existence of a foam performs two functions. First, it expands the material out of its buried location to interpose the foam between the source of heat and the wood. Second, foams provide superior insulation, and this slows the rate of temperature rise which reduces the rate of flame spread.

Any difficultly burnable intumescent material may be used herein. The intumescent coating compositions are themselves well known in the art, it being the confined and buried location of the coatings which constitutes this invention.

Referring more particularly to the intumescent compositions which may be used in this invention, these will broadly include an organic resinous binder material, a blowing agent which will release a gas when heated, and a fire retardant agent which will create a difficultly burnable foam. The intumescent compositions do not normally sand well, and consequently, tend to be rough; they also tend to absorb subsequent coats making it difficult to obtain the smooth attractive surface normally associated with this type of product. Further, moisture and temperature conditions vary on the surface of hardwoods such as lauan, kapur and similar species as the result of weather conditions, plant locations, etc., thus making it difficult to apply these coatings of adequate thickness and still obtain uniform adhesion of the required overcoatings.

The fire retardant agent may be constituted by diverse agents, but is preferably a phosphate, such as polyammonium phosphate. A commercial material of this type is Phoschek P30 supplied by Monsanto, but several other similar materials are available from other suppliers. Borates are also useful.

The binders are preferably supplied in aqueous emulsion, polymers and copolymers of vinyl acetate being particularly preferred. The fire retardant agent may be a polyethylene oxide adduct of phosphoric acid or an alkali metal salt thereof, in which case it can be used as the emulsifying agent in the emulsion.

The gasifying agents are subject to wide variation, as is known, but melamine is useful and will be used as illustrative.

Auxiliary agents which help to form an insulating char are helpful, but not necessary. Dipentaerythritol will be used to illustrate such materials.

Other agents may be used in small amount to help confine the foam as it forms, and such materials are also optional and will be illustrated by waxes which may be chlorinated.

The point to be observed is that commonly available intumescent coating compositions can be used herein without modification, and the details of the intumescent coating are not of consequence herein.

It is also desired to point out that while the invention is primarily concerned with wood which must be embossed to start the process, it is also applicable to hardboard, particleboard, fibreboard and lumber which may be initially formed to include an embossed surface so that an initial embossing step becomes unnecessary. Similarly, the embossment provides depressed portions by densifying the wood in selected areas, but the same result can less desirably be obtained by scraping the wood, and the term "embossing" is to be broadly construed.

Also, the intumescent material functions to protect the wood, and thus it provides a benefit even when the coating and printing is applied to paper which is then laminated to the wood surface. Accordingly, this variation is considered to be within the invention.

The invention is illustrated in the Example which follows.

EXAMPLE I

A 3.6 millimeter lauan plywood panel (the lauan mahogany veneer which is finished is about 0.8 millimeter in thickness) is embossed with a design that covers about 40% of the surface area of the panel. The embossing is of a design selected to give relatively uniform coverage of the surface and has an average depth of about 0.03 inch. The design is constituted by a series of depressed lines having an average width of about 1/16 inch and spaced apart an average distance of ¼ inch. The depressed lines are broken and staggered with respect to one another and cover about 40% of the surface area of the wood. An intumescent composition is then applied by Reverse Roll Coater. This is accomplished by essentially normal application techniques for the Reverse Roll Coater, i.e., so as to remove the excess material and not "paint" the undepressed portions of the wood surface. The depressed portions will then receive the deposit of intumescent coating and will, in effect, meter the required amount to obtain the specific flame spread rating desired. The intumescent composition is as follows:

| Component | Parts By Weight |
|---|---|
| (1) Binder - 50% solids aqueous emulsion of polyvinyl acetate | 9.3 |
| (2) Gasifying agent - melamine | 7.3 |
| (3) Fire retardant - polyammonium phosphate (Phoschek P30 may be used) (Monsanto) | 24.1 |
| (4) Char - forming agent - dipentaerythritol | 7.0 |
| (5) Filming material - chlorowax (melting range = 102–130° C.) | 3.7 |

The solid materials are ground and incorporated into the emulsion binder as is the normal production of paint. The resulting composition is applied to the wood in two or more applications to insure filling essentially all of the depressed portions. After application to the wood, the panel is dried by passing the wet-coated panel through an oven to remove the water. This provides a surface temperature of about 135° F.

The dried panels then receive one or more coatings of a sanding aqueous filler. This filler is constituted by a polyvinyl acetate emulsion pigmented with barytes, calcium carbonate and talc in a ratio of 15/60/25 in an amount to provide a pigment to binder weight ratio of 4:1.

After the filler has been applied, dried and sanded smooth, a base coat is applied. The base coat is as follows:

A 50% polyvinyl acetate aqueous emulsion is pigmented with titanium dioxide, yellow and red iron oxides and carbon black together with a silicate extender in a ratio of pigment to binder of 3:1. The pigments are added in aqueous suspension to provide a solids content of 58%. 40% of the pigments are the silicate extender, 50% is titanium dioxide, and the balance of iron oxides and carbon black provide the desired coloration (in this case a medium brown).

The base coat is applied by roller coats in two applications and dried by removing water to provide a surface temperature of 130° F.

Printing is by offset gravure process using any desired type of ink.

Overcoating is obtained by applying by roller coating, a clear solution of a short oil soya alkyd blended with a butylated urea-formaldehyde condensate in a weight ratio of 50/50 applied in a 50/50 butanol/xylene solution.

The final panel is obtained by baking to a surface temperature of 175° F.

As to the weight of material deposited, in this example, a deposit of 8.0–9.0 grams of intumescent material/sq. ft. (which corresponds to the application of 1 gallon to about 350 square feet) yields a flame spread rating of 42–47 for the completed panel.

I claim:

1. A coated and printed wood paneling having an attractive grained appearance and characterized by greatly decreased flame spread rating comprising a panel core having a wood veneer surface, said wood surface being depressed in a relatively uniform pattern of depressed portions covering from about 20% up to about 70% of the surface area of the wood to a depth of at least about 0.01 inch, said depressed portions being filled with an intumescent fire retardant filler which is substantially removed from the undepressed wood surface, and the undepressed wood surface and the intumescent filler in said depressed portions being covered with a printed coating which provides an attractive grained appearance.

2. A coated and printed wood paneling as recited in claim 1 in which the surface having the grained appearance is embossed.

3. A coated and printed wood paneling as recited in claim 1 in which said printed coating is carried on a paper laminated to the wood surface.

4. A coated and printed wood paneling as recited in claim 1 in which said pattern of depressed portions is constituted by lines depressed to a depth of from about 0.025 inch to about 0.035 inch.

5. A coated and printed wood paneling as recited in claim 4 in which said lines have a width of about 1/32 inch to ⅛ inch and are spaced about ¼ inch to ½ inch apart.

* * * * *